(12) United States Patent
Lewis-Linde

(10) Patent No.: US 10,306,867 B2
(45) Date of Patent: Jun. 4, 2019

(54) BIRTHING CHAMBER ASSEMBLY

(71) Applicant: Celeste Lewis-Linde, Gary, IN (US)

(72) Inventor: Celeste Lewis-Linde, Gary, IN (US)

(*) Notice: Subject to any disclaimer, the term of this patent is extended or adjusted under 35 U.S.C. 154(b) by 185 days.

(21) Appl. No.: 15/376,136

(22) Filed: Dec. 12, 2016

(65) Prior Publication Data
US 2018/0160647 A1   Jun. 14, 2018

(51) Int. Cl.
*A01K 1/00* (2006.01)
*A01K 1/03* (2006.01)

(52) U.S. Cl.
CPC .................................. *A01K 1/033* (2013.01)

(58) Field of Classification Search
CPC .......... A01K 1/03; A01K 1/033; A01K 1/034; A01K 1/035; A01K 1/0353
USPC ........................................................ 119/482
See application file for complete search history.

(56) References Cited

U.S. PATENT DOCUMENTS

| | | | | |
|---|---|---|---|---|
| 2,963,003 A * | 12/1960 | Oberg | ................... | A01K 1/0114 119/166 |
| 3,308,789 A * | 3/1967 | Artig | ...................... | A01K 1/033 119/482 |
| D230,285 S * | 2/1974 | Dilley | ......................... | 119/165 |
| 4,161,924 A * | 7/1979 | Welker | ................... | A01K 1/033 119/482 |
| 4,295,446 A * | 10/1981 | Voss | ......................... | A01K 1/033 119/499 |
| 4,576,116 A * | 3/1986 | Binkert | .................. | A01K 1/033 119/498 |
| 4,624,380 A | 11/1986 | Wernette | | |
| 5,361,725 A * | 11/1994 | Baillie | .................. | A01K 1/0107 119/161 |
| 5,488,929 A * | 2/1996 | Pierson | ................. | A01K 1/0125 119/170 |
| D376,875 S * | 12/1996 | Glickstein | ..................... | D30/118 |
| D377,852 S * | 2/1997 | Iben | ............................ | D30/118 |
| D384,777 S * | 10/1997 | Propst | ......................... | D30/108 |
| D398,089 S | 9/1998 | Reed | | |
| D406,923 S * | 3/1999 | Simpkins | ..................... | D30/118 |
| 5,986,217 A | 11/1999 | Strum | | |
| 6,286,461 B1 * | 9/2001 | Martz | .................. | A01K 1/0254 119/497 |
| 6,318,294 B1 * | 11/2001 | Richmond | ............. | A01K 1/033 119/482 |
| D455,872 S * | 4/2002 | Sturgis | ........................ | D30/118 |
| 6,425,348 B1 * | 7/2002 | Twain | .................... | A01K 1/033 119/482 |
| 6,561,130 B1 * | 5/2003 | Sage, Jr. | .............. | A01K 1/0107 119/166 |
| 6,742,476 B2 * | 6/2004 | Sage, Jr. | .............. | A01K 1/0107 119/166 |

(Continued)

FOREIGN PATENT DOCUMENTS

WO   WO-2016164868 A1 *  10/2016  ........... A01K 1/0107

*Primary Examiner* — Monica L Williams
*Assistant Examiner* — Aaron M Rodziwicz

(57) ABSTRACT

A birthing chamber assembly includes a housing. The housing is positioned at an intersection between a pair of vertical support surfaces. Thus, a feline may reside in the housing when the feline is birthing kittens. A lid is removably positioned on the housing to shelter the feline. The lid has an aperture extending therethrough to facilitate the feline to enter the housing. The aperture is spaced from the housing when the lid is positioned on the housing. Thus, the aperture inhibits the kittens from exiting the housing.

5 Claims, 5 Drawing Sheets

(56) References Cited

U.S. PATENT DOCUMENTS

| | | | |
|---|---|---|---|
| 6,895,898 B1 * | 5/2005 | Kitch | A01K 1/033 119/416 |
| 7,044,082 B1 * | 5/2006 | Hewett | A01K 1/031 119/417 |
| 7,044,083 B2 * | 5/2006 | Farmer | A01K 1/0254 119/474 |
| D523,182 S * | 6/2006 | Lieu | D30/108 |
| D533,971 S * | 12/2006 | Carter | D30/108 |
| 7,178,483 B2 * | 2/2007 | Wu | A01K 1/033 119/498 |
| 7,343,876 B2 * | 3/2008 | Frisbee | A01K 1/03 119/461 |
| D615,255 S * | 5/2010 | Kellogg | D30/160 |
| D616,160 S * | 5/2010 | Kellogg | D30/160 |
| 7,712,437 B2 * | 5/2010 | Leung | A01K 1/0245 119/28.5 |
| 7,861,674 B2 * | 1/2011 | Mercier | A01K 1/035 119/484 |
| D652,996 S * | 1/2012 | Campbell | D30/108 |
| D653,404 S * | 1/2012 | Wong | D30/108 |
| D669,644 S * | 10/2012 | Chang | D30/112 |
| D677,839 S * | 3/2013 | Goldsmith | D30/108 |
| D690,059 S | 9/2013 | Robbins | |
| 8,714,111 B2 * | 5/2014 | Bryson | A01K 1/0254 119/453 |
| D708,399 S * | 7/2014 | Lipscomb | D30/108 |
| D713,605 S * | 9/2014 | Lipscomb | D30/108 |
| D725,319 S * | 3/2015 | Olson | D30/161 |
| D756,041 S * | 5/2016 | Robbins, III | D25/19 |
| 9,326,483 B2 * | 5/2016 | Hall | A01K 1/033 |
| 2005/0217598 A1 * | 10/2005 | Harper | A01K 1/0254 119/482 |
| 2007/0051323 A1 * | 3/2007 | Guard | A01K 1/033 119/482 |
| 2007/0181076 A1 * | 8/2007 | Dietz | A01K 1/03 119/482 |
| 2007/0240647 A1 * | 10/2007 | Dietz | A01K 1/03 119/482 |
| 2008/0295780 A1 * | 12/2008 | Huang | A01K 1/033 119/482 |
| 2010/0031895 A1 * | 2/2010 | Pierpont | A01K 1/033 119/499 |
| 2011/0203528 A1 * | 8/2011 | Northrop | A01K 1/0254 119/497 |
| 2014/0305378 A1 * | 10/2014 | Lever | A01K 1/03 119/417 |
| 2014/0305379 A1 * | 10/2014 | Ballentyne | A01K 1/033 119/498 |
| 2016/0324116 A1 * | 11/2016 | Ballentyne | A01K 1/033 |
| 2016/0366850 A1 * | 12/2016 | Robbins, III | A01K 1/033 |
| 2017/0079238 A1 * | 3/2017 | Renforth | A01K 1/0353 |
| 2018/0000042 A1 * | 1/2018 | Ballentyne | A01K 1/033 |

* cited by examiner

BIRTHING CHAMBER ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIE THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention
(2) Description of Related Art Including Information Disclosed Under 37 CFR 1.97 and 1.98

The disclosure and prior art relates to birthing devices and more particularly pertains to a new birthing device for sheltering a feline when the feline is birthing kittens.

BRIEF SUMMARY OF THE INVENTION

An embodiment of the disclosure meets the needs presented above by generally comprising a housing. The housing is positioned at an intersection between a pair of vertical support surfaces. Thus, a feline may reside in the housing when the feline is birthing kittens. A lid is removably positioned on the housing to shelter the feline. The lid has a aperture extending therethrough to facilitate the feline to enter the housing. The aperture is spaced from the housing when the lid is positioned on the housing. Thus, the aperture inhibits the kittens from exiting the housing.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
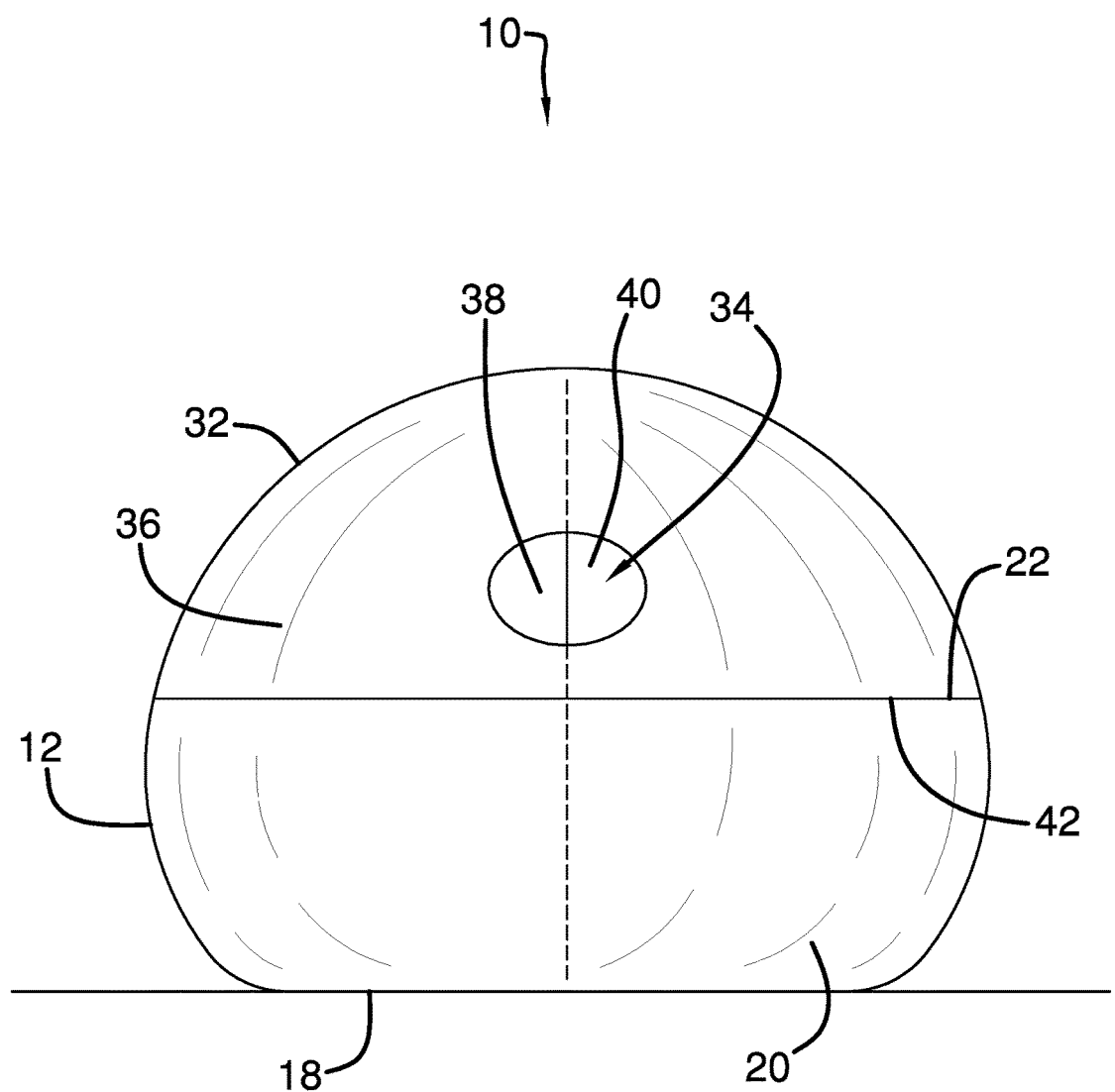
FIG. 1 is a front view of a birthing chamber assembly according to an embodiment of the disclosure.
Figure 2:
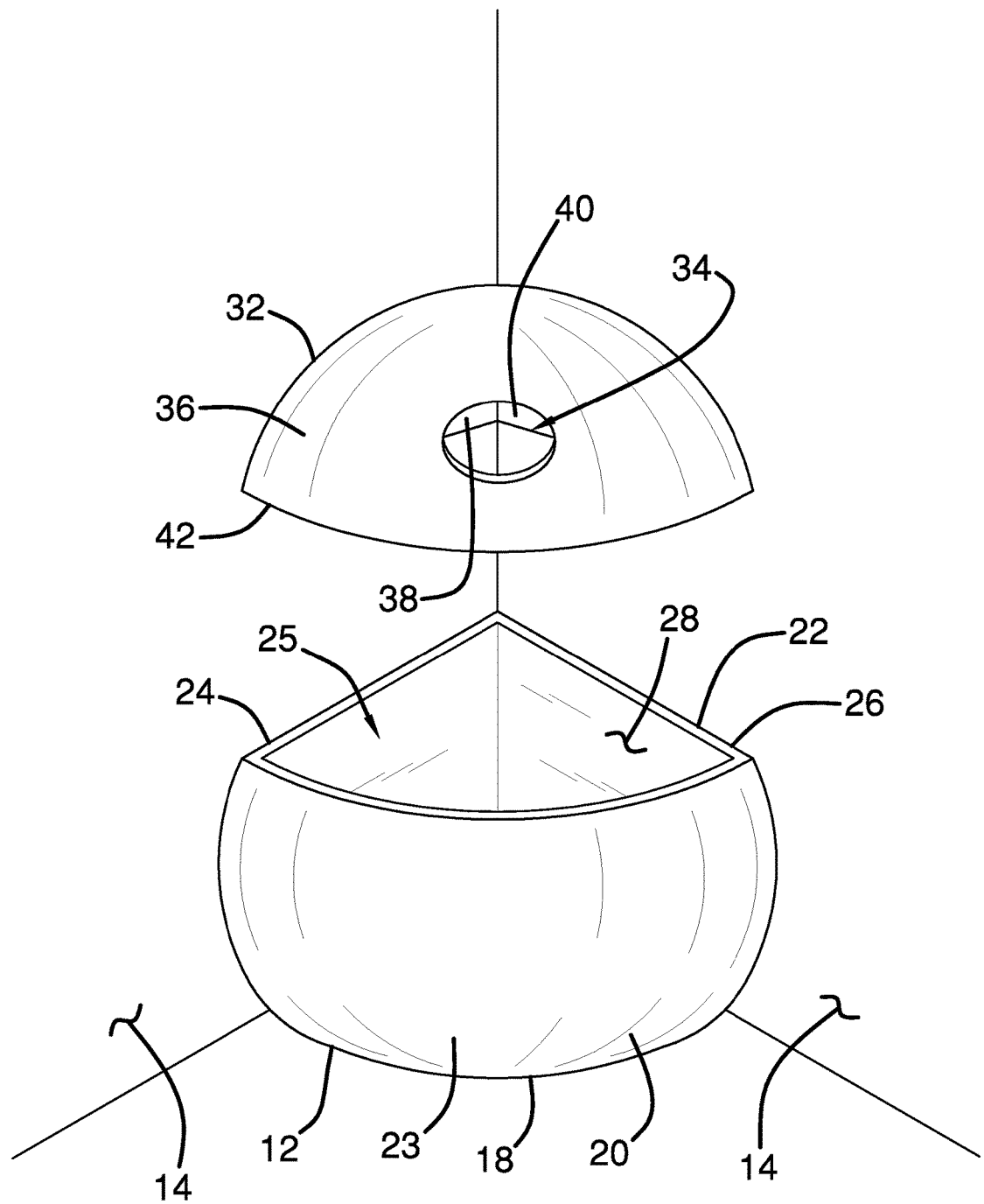
FIG. 2 is an exploded perspective view of an embodiment of the disclosure.
Figure 3:
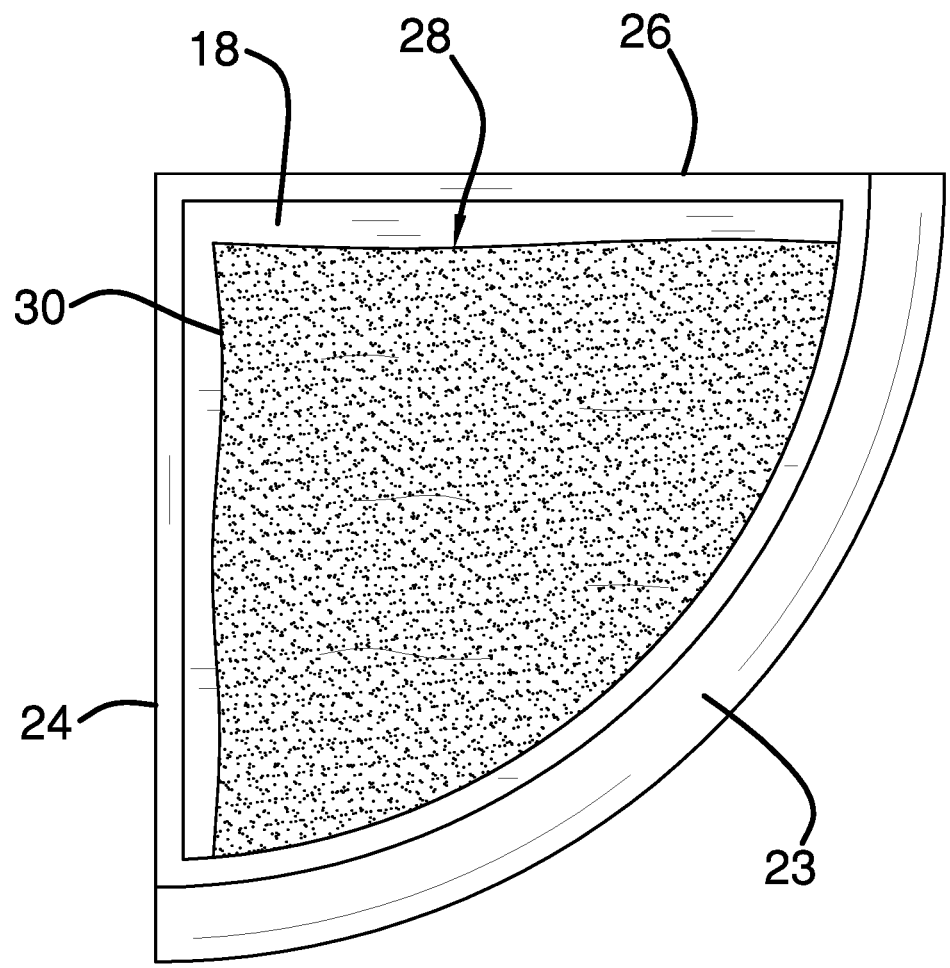
FIG. 3 is a top view of housing of an embodiment of the disclosure.

With reference now to the drawings, and in particular to FIGS. 1 through 5 thereof, a new birthing device embodying the principles and concepts of an embodiment of the disclosure and generally designated by the reference numeral 10 will be described.

As best illustrated in FIGS. 1 through 5, the birthing chamber assembly 10 generally comprises a housing 12. The housing 12 is positioned at an intersection between a pair of vertical support surfaces 14. The vertical support surfaces 14 may be exterior walls of a building or the like. Moreover, the intersection between the vertical support surfaces 14 may be an inside corner of the exterior walls. A feline 16 may reside in the housing 12 when the feline 16 is birthing kittens.

The housing 12 has a bottom wall 18 and a peripheral wall 20 extending upwardly therefrom. The peripheral wall 20 has a distal edge 22 with respect to the bottom wall 18 to define an opening 25 into the housing 12. The peripheral wall 20 has a front side 23, a first lateral side 24 and a second lateral side 26. The front side 23 is concavely arcuate between the first lateral side 24 and the second lateral side 26.

The first lateral side 24 intersects the second lateral side 26. Thus, the housing 12 has a wedge shaped cross section taken along a vertical axis extending through the bottom wall 18. Each of the first lateral side 24 and the second lateral side 26 abuts an associated one of the vertical support surfaces 14 having the front side 23 being exposed. The housing 12 may be comprised of a biodegradable material such as cardboard or the like.

The housing 12 has an interior surface 28. A liner 30 is provided and the liner 30 is positioned on the interior surface 28 corresponding to the bottom wall 18 of the housing 12. The liner 30 may be comprised of a deformable and fluid permeable material such as paper or the like. The liner 30 absorbs odor and fluids associated with the feline 16. The liner 30 is removed from the housing 12 when the feline 16 has completed birthing the kittens. Thus, the odor and fluids associated with the feline 16 are removed from the housing 12.

A lid 32 is provided and the lid 32 is removably positioned on the housing 12. Thus, the lid 32 shelters the feline 16. The lid 32 has an aperture 34 extending therethrough. The feline 16 passes through the aperture 34 to enter the housing 12. The aperture 34 is spaced from the housing 12 when the lid 32 is positioned on the housing 12. Thus, the kittens are inhibited from exiting the housing 12.

The lid 32 has a front wall 36, a first sidelong wall 38 and a second sidelong wall 40. The front wall 36 is concavely arcuate between each of the first sidelong wall 38 and the second sidelong wall 40. The first sidelong wall 38 intersects the second sidelong wall 40. Thus, the lid 32 has a wedge shaped cross section taken along a vertical axis extending through the lid 32. The lid 32 may be comprised of a biodegradable material such as cardboard or the like.

The lid 32 has a lower edge 42. The lower edge 42 engages the distal edge 22 of the housing 12 when the lid 32 is positioned on the housing 12. Moreover, the lower edge 42 is coextensive with the distal edge 22 when the lid 32 is positioned on the housing 12. The aperture 34 extends through the front wall 36. Moreover, the aperture 34 is spaced from the lower edge 42 corresponding to the front wall 36.

Figure 4:
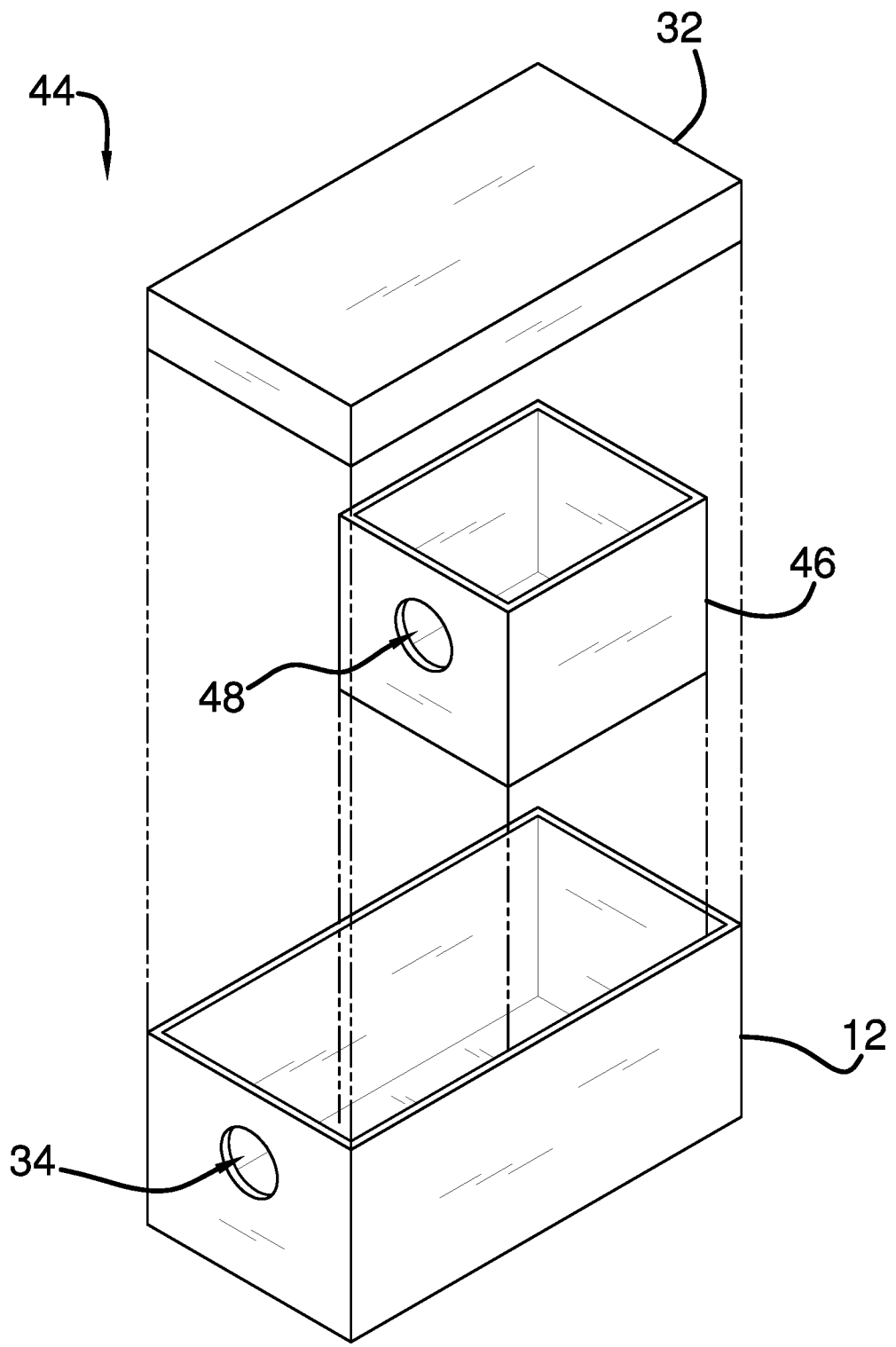
FIG. 4 is a perspective view of an alternative embodiment of the disclosure.
Figure 5:
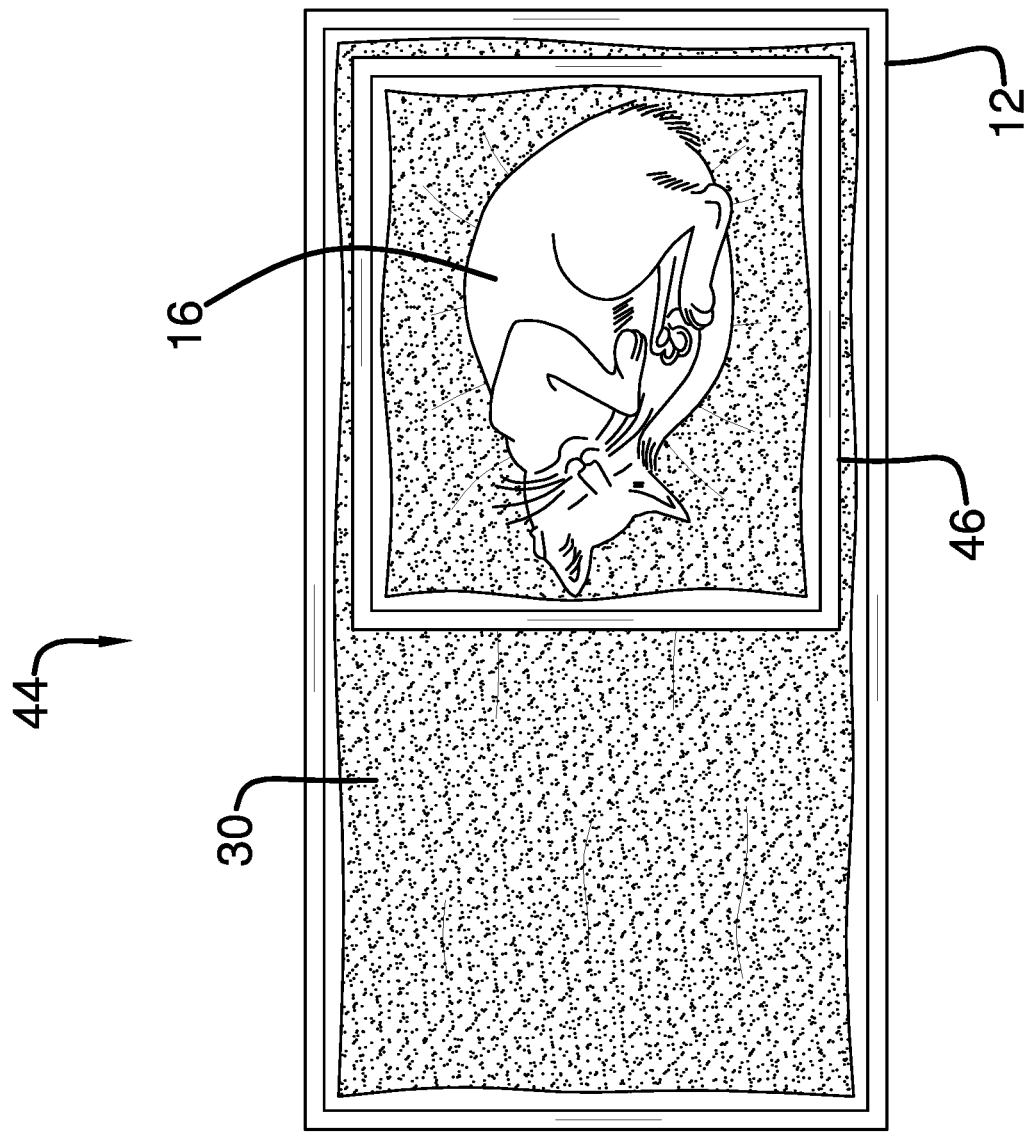
FIG. 5 is a perspective in-use view of an alternative embodiment of the disclosure.

In an alternative embodiment 44 as shown in FIGS. 4 and 5, each of the housing 12 and the lid 32 may have a rectangular shape. A secondary housing 46 may be provided and the secondary housing 46 is removably positioned within the housing 12. Moreover, the secondary housing 46 has a length and a width that is less than a length and a width of the housing 12. The aperture 34 may be positioned on the housing 12. A hole 48 extends through the secondary housing 46. The hole 48 is aligned with the aperture 34 when the secondary housing 46 is positioned in the housing 12. Thus, the feline 16 may enter the secondary housing 46.

In use, the housing 12 is positioned outdoors at the intersection between the vertical support surfaces 14. The liner 30 is positioned in the housing 12 and the lid 32 is positioned on the housing 12. The feline 16 enters the housing 12 through the aperture 34 when the feline 16 is about the birth the kittens. The housing 12 and the lid 32 shelter the feline 16 and kittens. The liner 30 is removed and the housing 12 is cleaned when the feline 16 removes the kittens from the housing 12. The housing 12 and the lid 32 facilitate shelter for feral or otherwise homeless felines 16 during birthing labor.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A birthing chamber assembly being configured to house a feline when the feline is birthing kittens, said assembly comprising:
    a housing being configured to be positioned at an intersection between a pair of vertical support surfaces thereby facilitating a feline to reside in the housing when the feline is birthing kittens; and
    a lid being removably positioned on said housing wherein said lid is configured to shelter the feline, said lid having a aperture extending therethrough wherein said aperture is configured to facilitate the feline to enter said housing, said aperture being spaced from said housing when said lid is positioned on said housing wherein said aperture is configured to inhibit the kittens from exiting said housing, said lid having a front wall, a first sidelong wall and a second sidelong wall, said front wall being concavely arcuate between each of said first sidelong wall and said second sidelong wall, said first sidelong wall intersecting said second sidelong wall such that said lid has a wedge shaped cross section taken perpendicular to a vertical axis extending through said lid, wherein said aperture extends through said lid offset from an outermost edge of said housing towards an intersection of said first sidelong wall and said second sidelong wall and wherein said aperture is facing upwardly and away from said intersection of said first sidelong wall and said second sidelong wall.

2. The assembly according to claim 1, further comprising said housing having a bottom wall and a peripheral wall extending upwardly therefrom, said peripheral wall having a distal edge with respect to said bottom wall to define an opening into said housing.

3. The assembly according to claim 2, wherein said peripheral wall has a front side, a first lateral side and a second lateral side, said front side being concavely arcuate between said first lateral side and said second lateral side, said first lateral side intersecting said second lateral side such that said housing has a wedge shaped cross section taken perpendicular a vertical axis extending through said bottom wall, each of said first lateral side and said second lateral side being configured to abut an associated one of the vertical support surfaces having said front side being exposed.

4. The assembly according to claim 1, wherein:
    said housing has a distal edge; and
    said lid has a lower edge, said lower edge engaging said distal edge of said housing when said lid is positioned on said housing having said lower edge being coextensive with said distal edge.

5. A birthing chamber assembly being configured to house a feline when the feline is birthing kittens, said assembly comprising:
    a housing being configured to be positioned at an intersection between a pair of vertical support surfaces thereby facilitating a feline to reside in the housing when the feline is birthing kittens, said housing having a bottom wall and a peripheral wall extending upwardly therefrom, said peripheral wall having a distal edge with respect to said bottom wall to define an opening into said housing, said peripheral wall having a front side, a first lateral side and a second lateral side, said front side being arcuate between said first lateral side and said second lateral side, said first lateral side intersecting said second lateral side such that said housing has a wedge shaped cross section taken perpendicular to a vertical axis extending through said bottom wall, each of said first lateral side and said second lateral side being configured to abut an associated one of the vertical support surfaces having said front side being exposed; and
    a lid being removably positioned on said housing wherein said lid is configured to shelter the feline, said lid having a aperture extending therethrough wherein said aperture is configured to facilitate the feline to enter said housing, said aperture being spaced from said housing when said lid is positioned on said housing wherein said aperture is configured to inhibit the kittens from exiting said housing, said lid having a front wall, a first sidelong wall and a second sidelong wall, said front wall being concavely arcuate between each of said first sidelong wall and said second sidelong wall, said first sidelong wall intersecting said second sidelong wall such that said lid has a wedge shaped cross section taken perpendicular to a vertical axis extending through said lid, said lid having a lower edge, said lower edge engaging said distal edge of said housing when said lid is positioned on said housing having said lower edge being coextensive with said distal edge, said aperture extending through said front wall, said aperture being spaced from said lower edge corresponding to said front wall wherein said aperture is offset from an outermost edge of said housing towards an intersection of said first sidelong wall and said second sidelong wall and wherein said aperture is facing upwardly and away from said intersection of said first sidelong wall and said second sidelong wall.

* * * * *